United States Patent
Nosker et al.

(10) Patent No.: US 8,436,099 B2
(45) Date of Patent: *May 7, 2013

(54) METHOD OF RECYCLING PAINTS AS A COMPONENT OF AN IMMISCIBLE POLYMER BLEND

(75) Inventors: Thomas J. Nosker, Stockton, NJ (US); Richard Lehman, Princeton, NJ (US); Robert Hamill, West Milford, NJ (US); Jennifer K. Lynch, Franklin Park, NJ (US)

(73) Assignee: Rutgers The State University of New Jersey, New Brunswick, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/308,232

(22) Filed: Nov. 30, 2011

(65) Prior Publication Data

US 2012/0271002 A1 Oct. 25, 2012

Related U.S. Application Data

(63) Continuation of application No. 12/096,743, filed as application No. PCT/US2006/068170 on Dec. 11, 2006, now Pat. No. 8,071,685.

(60) Provisional application No. 60/748,612.

(51) Int. Cl.
*C08L 33/02* (2006.01)
*C08L 33/06* (2006.01)
*C04B 24/26* (2006.01)

(52) U.S. Cl.
USPC ............................ 525/221; 525/227; 524/523

(58) Field of Classification Search .................. 525/221, 525/227; 524/523
See application file for complete search history.

(56) References Cited

U.S. PATENT DOCUMENTS

| | | | |
|---|---|---|---|
| 4,069,186 A * | 1/1978 | Ramig | 523/221 |
| 4,168,249 A | 9/1979 | Meyer | |
| 4,231,911 A | 11/1980 | Santiago | |
| 4,972,036 A | 11/1990 | Elmore et al. | |
| 5,274,039 A | 12/1993 | Sirinyan et al. | |
| 5,476,624 A * | 12/1995 | Sato et al. | 264/83 |
| 6,743,520 B2 * | 6/2004 | Street et al. | 428/483 |
| 6,958,127 B1 | 10/2005 | Suzuki et al. | |
| 8,071,685 B2 * | 12/2011 | Nosker et al. | 525/221 |

FOREIGN PATENT DOCUMENTS

| | | | |
|---|---|---|---|
| DE | 4237209 A1 | 5/1994 | |
| EP | 0960918 A2 | 12/1999 | |
| GB | 826009 A | 12/1959 | |

* cited by examiner

*Primary Examiner* — Nathan M Nutter
(74) *Attorney, Agent, or Firm* — Fox Rothschild LLP

(57) ABSTRACT

An immiscible polymer blend including a first polymer component including a paint polymer phase and a second polymer component immiscible with the first polymer component and selected from polyolefins and polymethylmethacrylate (PMMA). A method of recycling paint by blending a first polymer component including a paint polymer phase with a second polymer component immiscible with the first polymer component and selected from polyolefins and polymethylmethacrylate (PMMA) is also presented.

19 Claims, 4 Drawing Sheets

METHOD OF RECYCLING PAINTS AS A COMPONENT OF AN IMMISCIBLE POLYMER BLEND

CROSS REFERENCE TO RELATED APPLICATIONS

This application is a continuation of U.S. Ser. No. 12/096,743, filed Jun. 13, 2008, and now U.S. Pat. No. 8,071,685, which is a national stage entry of PCT/US06/68170, filed Dec. 2006, which application claims priority to U.S. Provisional Application Ser. No. 60/748,612, which was filed on Dec. 9, 2005. The disclosure of these applications are incorporated herein by reference.

BACKGROUND OF THE INVENTION

According to the United States Environmental Protection Agency, unwanted paint is the largest component of residential household hazardous waste across the country. It is estimated that 34 million gallons of leftover consumer paint is generated annually in the United States. However, this estimate does not include significant amounts of waste paint generated by contractors, retailer mis-tints, paint manufacturers, private corporations or other businesses, schools, and other public agencies.

The primary component of paint retailers' waste stream consists of unused full containers of paint that are returned as a mis-tint or other mistake. The cost of final disposition, a per container cost for either recycling or hazardous waste disposal, is very high for the retailer. Much of this paint could be re-blended and converted into paint for use by either government or private entities, particularly the unused gallons returned to retailers. However, markets for re-blended paint have not proven profitable as of yet.

Currently, latex paint is the most popular paint on the market. In 1997, $270,000 was spent collecting and recycling 1.3 million pounds of latex paint. The amount of post-consumer latex paint has grown each year, and in 2003, the quantity of latex paint collected increased to two million pounds.

This high volume of waste or unwanted latex paint in the municipal solid waste stream makes it an attractive material to recycle. Moreover, many jurisdictions prohibit waste paint disposal in a liquid state, due to its propensity to spill on route to the landfill or incinerator that may cause equipment contamination.

Latex paint is composed of 59.3% water, 15.7% latex polymer concentration, 12.5% titanium dioxide concentration, 12.5% extender pigments, and 1.1% ethylene glycol concentration. However in the 1980s and earlier, mercury was used as a preservative in latex paint. Thus, liquid waste paint collected at recycling facilities must be tested for mercury and other contaminants prior to deciding its fate: recycled for reuse or use in non-traditional products, landfill, or hazardous waste. Latex paint manufactured after the 1980s may be legally disposed of in a dried, solid form without going to a hazardous waste landfill. Drying waste paint to a solid state releases only water and fractional amounts of safe, non-organic volatiles into the environment. However it is time consuming, and requires considerable effort due to weather conditions and safety.

Thus, there is a need to develop a proactive, voluntary recycling program and technology for reusing this material while simultaneously creating financial benefits. Such a program must be successful in removing a large percentage of unused paint from the waste stream to negate the need for a mandatory or special taxation program.

SUMMARY OF THE INVENTION

The present invention utilizes recycled paint for preparing immiscible polymer blends. An immiscible polymer blend is presented, which includes a first polymer component having a paint polymer phase and a second polymer component immiscible with the first polymer component and selected from polyolefins and polymethylmethacrylate (PMMA).

One embodiment includes a method of recycling paint by blending a first polymer component having a paint polymer phase with a second polymer component immiscible with the first polymer component and selected from polyolefins and polymethylmethacrylate (PMMA).

Yet another embodiment includes an article of an immiscible polymer blend, wherein the blend includes a first polymer component having a paint polymer phase and a second polymer component immiscible with the first polymer component and selected from polyolefins and polymethylmethacrylate (PMMA).

An additional embodiment includes an article formed using a method for recycling paint, wherein the method includes blending a first polymer component having a paint polymer phase with a second polymer component immiscible with the first polymer component and selected from polyolefins and polymethylmethacrylate (PMMA).

DETAILED DESCRIPTION OF THE INVENTION

Figure 1:
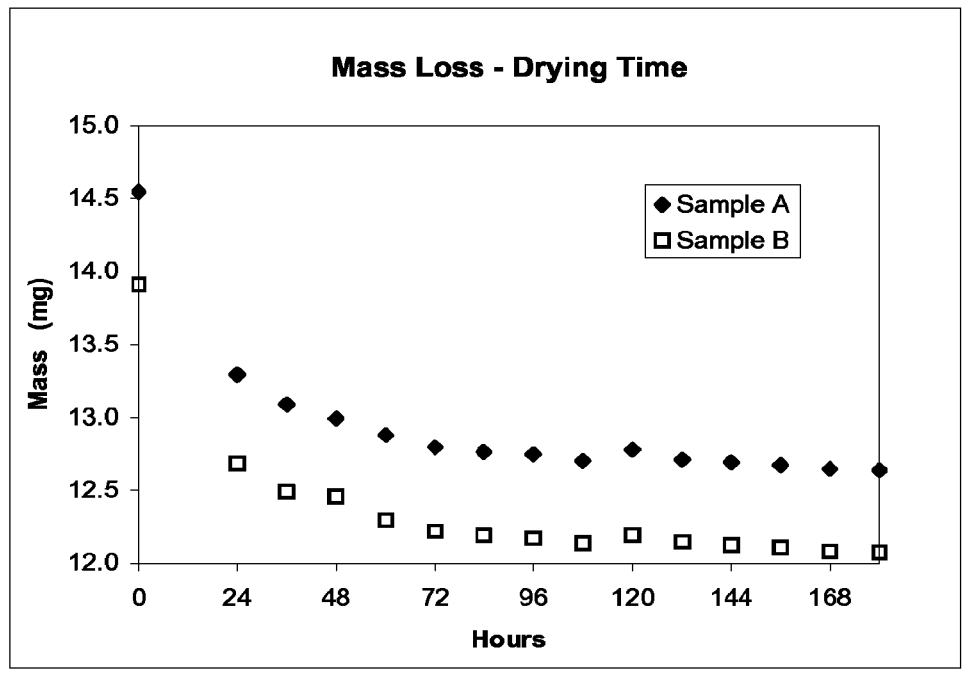
FIG. 1 is depicts mass loss as a function of drying time for two paint samples, A and B.

The present invention provides pigmented immiscible polymer blends formed using paint as one of the polymer components. An immiscible polymer blend in accordance with the present invention includes a first polymer component, which includes a paint polymer phase, and a second polymer component immiscible with the first polymer component and selected from polyolefins and polymethylmethacrylate (PMMA).

The first polymer component includes a paint polymer phase preferably derived from water-based paints, oil-based paints, or solvent-based paints. Preferably, the paint is collected from a waste treatment facility or directly from the unwanted supply of a retailer or consumer. The paint is collected in either a liquid or a dried form. In one embodiment, the paint is collected in a liquid form and blended with the second immiscible polymer component in the liquid form. In another embodiment, the paint is collected in a liquid form and dried to reduce water, oil, and/or solvent content prior to melt-blending with the second immiscible polymer component.

In one embodiment, the first polymer component is a latex paint polymer phase preferably derived from flat latex paint or gloss latex paint. The terms "gloss paint" and "gloss latex paint" as used herein include semi-gloss and high-gloss paints.

The polymer phase of paint is typically formed from one or more polymers including acrylates, vinyl acrylates, vinyl acetates, styrene acrylates, polyurethanes, epoxies, neoprenes, polyesters, and alkyd polyesters. Paint containing acrylate and/or polyester polymers are preferred. The paint polymer phase can be blended with another miscible polymer before blending with an immiscible polymer component. Examples of miscible blends include polystyrene/polyphenylene oxide and polycarbonate/acrylonitrile butadiene styrene.

The paint polymer phase is blended with a second immiscible polymer component to form the immiscible polymer blends of the present invention. The second polymer component is selected from polyolefins and polymethylmethacrylate (PMMA). Exemplary polyolefins include polyethylene and polypropylene. Preferably, the second polymer component is selected from PMMA and high-density polyethylene (HDPE). A preferred blend includes a latex paint polymer phase derived from gloss paint and PMMA.

One embodiment includes a blend ratio of paint/second polymer component selected from 20/80, 30/70, and 35/65, wherein the ratio of 35/65 is preferred. In one embodiment, the second polymer component includes between about 65 and about 80% PMMA or HDPE by weight. In another embodiment, the first polymer component includes about 65% PMMA by weight.

Articles formed from the polymer blend are also presented. Suitable articles include those usually formed from polyolefins or PMMA. For example, a typical use for PMMA is as an impact resistant substitute for glass. Exemplary HDPE articles include packaging articles, preferably, containers, merchandise bags, shrink films, grocery sacks, and industrial liners.

The present invention also includes a method of recycling paint by blending a first polymer component comprising a paint polymer phase with a second polymer component immiscible with the first polymer component and selected from polyolefins and PMMA. In one embodiment, the first polymer component and the second immiscible polymer component are both in a liquid form prior to blending. An additional embodiment includes reducing the water, oil, and/or solvent content of the paint polymer phase after combining it with the second immiscible polymer component. For example, the water, oil, and/or solvent content of the paint polymer phase can be removed by heating and/or drawing a vacuum on the first polymer component/second immiscible polymer component blend. Exemplary devices for reducing water, oil, and/or solvent content of the paint polymer phase include twin screw extruders made by, for example, Leistritz Corp., Allendale, N.J., and paint devolatilizers. In one embodiment, the first polymer component and the second immiscible polymer component, both in liquid form, are blended in a twin screw extruder just prior to extrusion.

An additional embodiment includes the step of forming an article with the polymer blend. In one embodiment, the forming step includes injection molding, blow molding, thermoforming, rotational molding, or extrusion molding. Another embodiment includes an article formed according to the method of the present invention.

The following non-limiting examples set forth hereinbelow illustrate certain aspects of the invention.

EXAMPLES

Example 1

Paint Preparation and Analysis

Thirteen cans of post-consumer paint were collected, separated by gloss content, and labeled gloss or flat. Both high-gloss and semi-gloss paint were categorized as gloss, and the flat paint labeled flat.

A small sample was collected from each can, weighed, and weighed again after five days to determine changes in mass. Following this preliminary experiment, samples of both gloss and flat paint were poured into 25 by 55 cm Teflon baking sheets, dried under room temperature conditions over night in order to form a thin layer or solid layer at the surface, and placed in a Precision Mechanical Convectional Oven at 85° C. for a period of twelve hours. The twelve-hour period was repeated for each sample until the paint could be peeled off of the tray neatly. The total drying time varied due to gloss content. The flat paint total drying time was three to four days, while the gloss paint total drying time was five to seven days.

The resulting solid sheets of gloss paint were then cut into ten 5×9 cm sections and labeled A-J. The initial mass of the rectangular samples was recorded. The samples were dried further in a Fisher Scientific Isotemp Oven at a temperature of 85° C. for twenty-four hour periods, and the mass was recorded after each increment. Samples were dried until the change in mass after each period was minimal. The length, width, and height were measured and the density calculated for each sample.

The preliminary study for determining average weight loss of the gloss and flat paints resulted in average weight losses of 48.2% for gloss paint and 47.0% for flat paint. Table 1 shows the weight loss of the thirteen samples of paint collected after a five-day drying period. While there were only three samples of flat paint, it was hypothesized that the flat paint would have a lower weight percent loss than gloss paint due to the higher ceramic content in flat paint.

TABLE 1

Percent weight loss after 5-days drying time

| Sample | Weight % Loss | Type |
|---|---|---|
| 1 | 47.72 | Gloss |
| 2 | 36.68 | Flat |
| 3 | 49.25 | Gloss |
| 4 | 60.97 | Gloss |
| 5 | 48.15 | Gloss |
| 6 | 48.27 | Gloss |
| 7 | 46.75 | Gloss |
| 8 | 57.60 | Flat |
| 9 | 39.61 | Gloss |
| 10 | 46.76 | Flat |
| 11 | 43.86 | Gloss |
| 12 | 49.12 | Gloss |
| 13 | 48.00 | Gloss |

Table 2 shows the calculated density of ten samples of gloss paint, labeled A-J. The average density of the gloss samples is 1.45 g/cm$^3$. FIG. 1 depicts the mass loss as a function of drying time for two of the samples, A and B, over a period of 180 hours. As expected, the curve decreases at a decreasing rate until it levels off asymptotically and the weight change is minimal.

TABLE 2

Density of dried gloss paint

| Sample | Mass (mg) | Volume (cm³) | Density (g/cm³) |
|---|---|---|---|
| A | 14.55 | 0.010 | 1.44 |
| B | 13.91 | 0.008 | 1.68 |
| C | 12.31 | 0.009 | 1.33 |
| D | 13.69 | 0.009 | 1.45 |
| E | 12.78 | 0.008 | 1.57 |
| F | 11.13 | 0.008 | 1.45 |
| G | 8.92 | 0.008 | 1.15 |
| H | 12.41 | 0.009 | 1.32 |
| I | 12.51 | 0.008 | 1.47 |
| J | 14.45 | 0.009 | 1.60 |
| Average | | | 1.45 |

Example 2

Preparation and Analysis of Polymer Blends

The second phase of experiments involved blending various compositions of the dried, solid latex paint with HDPE or PMMA to produce paint/polymer blends. Composition ratios of 20/80%, 30/70%, and 35/65% by weight of Flat/HDPE, Gloss/HDPE, Flat/PMMA, and Gloss/PMMA were prepared, as well as 100% HDPE and 100% PMMA. The mixes were co-extruded using a Brabender Inteli-Torque Plasti-Corder extruder operating at 50 RPM at a temperature of 180° C. Once cooled, the extrudate was ground in a Nelmor grinder. Each blend was injection molded into tensile specimens using a Negri Bossi V55-200 injection molding machine operated at 205° C.

Tensile mechanical properties were determined using a MTS QTest/25 Elite Controller, according to ASTM D 638. Modulus, ultimate stress, and percent strain at fracture were calculated. The average results of five specimens are reported for each composition.

Thermal properties were determined using a TA Instruments Q 1000 Differential Scanning calorimeter in modulated DSC mode (MDSC) under an atmosphere of dry nitrogen. Approximately 8 mg samples of 35/65 Gloss/HDPE and 35/65 Gloss/PMMA were encapsulated in standard aluminum pans and sealed by crimping. DSC scans for each sample were conducted at 3° C./minute while simultaneously modulating at 2° C. every 40 seconds. The Gloss/HDPE sample was scanned over a temperature range of −20-200° C., and the Gloss/PMMA sample was scanned over a temperature range of −20-160° C. Each sample was heated, cooled, and reheated over the respective temperature range.

Table 3 shows the average tensile mechanical properties (modulus, ultimate stress, and strain at fracture) of Gloss/HDPE, Flat/HDPE, Gloss/PMMA, and Flat/PMMA paint/polymer blends. Strain at fracture is reported, although not all of the specimens fractured. The value represents the highest percent strain prior to test termination. Of the five specimens tested at each composition of 100% HDPE, Gloss/HDPE, Flat/HDPE, and Gloss/PMMA none fractured. However, for the Flat/PMMA compositions, none of the five specimens fractured at the 35/65% Flat/PMMA composition, but several samples did fracture at the 30/70% and 20/80% Flat/PMMA compositions. For the 100% PMMA composition, all five specimens tested fractured. The Gloss/PMMA blends have a higher percent strain at failure than neat PMMA.

TABLE 3

Average tensile properties of Gloss and Flat Paint/HDPE polymer blends and Gloss and Flat Paint/PMMA polymer blends at various compositions

| Sample | Modulus (MPa) | Ultimate Stress (MPa) | Strain at Fracture (%) |
|---|---|---|---|
| 0/100% Gloss/HDPE | 720 | 14.5 | 6.0+ |
| 20/80% Gloss/HDPE | 850 | 18.3 | 11.0+ |
| 30/70% Gloss/HDPE | 750 | 14.8 | 10.0+ |
| 35/65% Gloss/HDPE | 715 | 15.2 | 10.0+ |
| 30/100% Flat/HDPE | 720 | 14.5 | 14.0 |
| 20/80% Flat/HDPE | 840 | 14.8 | 22.0 |
| 30/70% Flat/HDPE | 715 | 13.7 | 25.0+ |
| 35/65% Flat/HDPE | 615 | 12.6 | 10.0+ |
| 0/100% Gloss/PMMA | 3480 | 65.0 | 6.0+ |
| 20/80% Gloss/PMMA | 3200 | 54.8 | 6.0+ |
| 30/70% Gloss/PMMA | 2750 | 48.1 | 6.0+ |
| 35/65% Gloss/PMMA | 2745 | 44.3 | 4.0 |
| 0/100% Flat/PMMA | 3480 | 65.0 | 5.0+ |
| 20/80% Flat/PMMA | 4395 | 54.7 | 2.9 |
| 30/70% Flat/PMMA | 4330 | 53.2 | 1.2 |
| 35/65% Flat/PMMA | 4030 | 50.1 | 4.0 |

Figure 2:
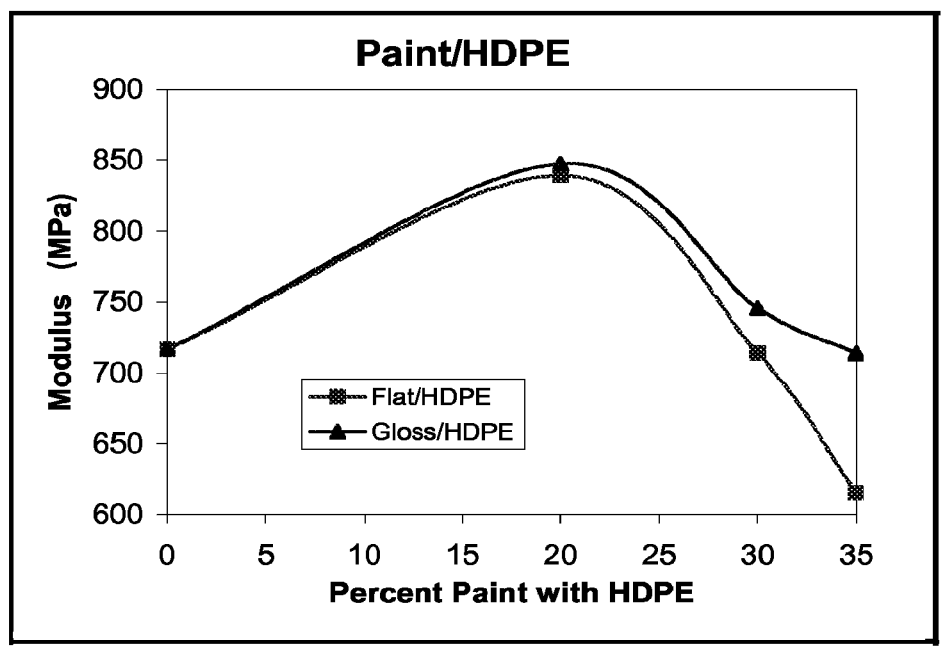
FIG. 2 is a graph depicting tensile modulus as a function of weight percent paint in paint/HDPE blends.
Figure 3:
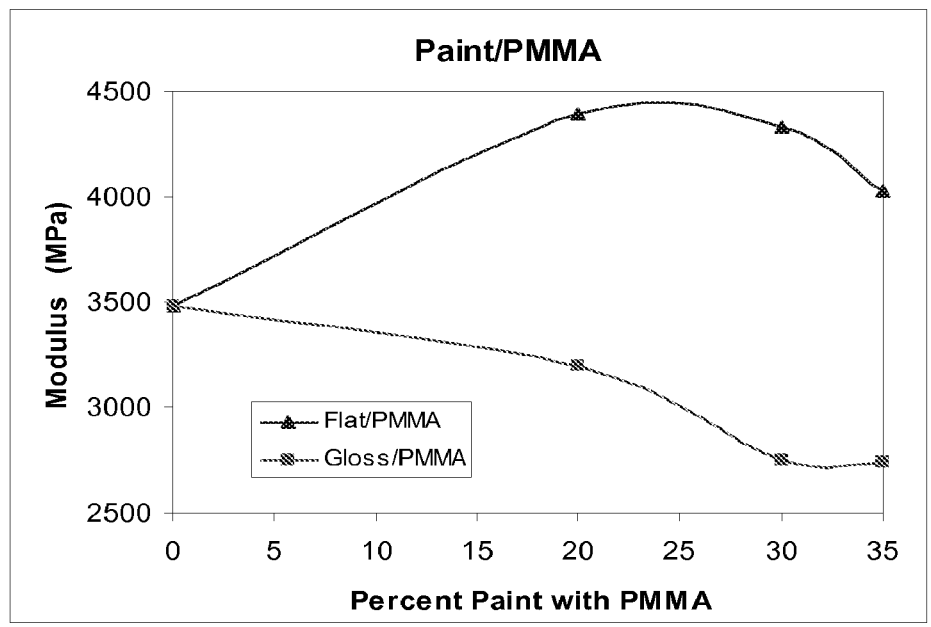
FIG. 3 is a graph depicting tensile modulus as a function of weight percent paint in paint/PMMA blends.

FIGS. 2 and 3 graphically depict a comparison of the tensile modulus as a function of paint content between Gloss/HDPE and Flat/HDPE blends and Gloss/PMMA and Flat/PMMA blends, respectively. The modulus of 100% HDPE (720 MPa) increases dramatically with the addition of 20% flat or gloss paint but then decreases back toward 720 MPa. With the addition of 35% flat paint, the modulus decreases below 720 MPa. As shown in FIG. 3, any addition of flat paint to PMMA increases the modulus over that of 100% PMMA (3,480 MPa). However, gloss paint has the opposite effect, and the modulus decreases from 3,480 MPa with any addition of gloss paint.

Figure 4:
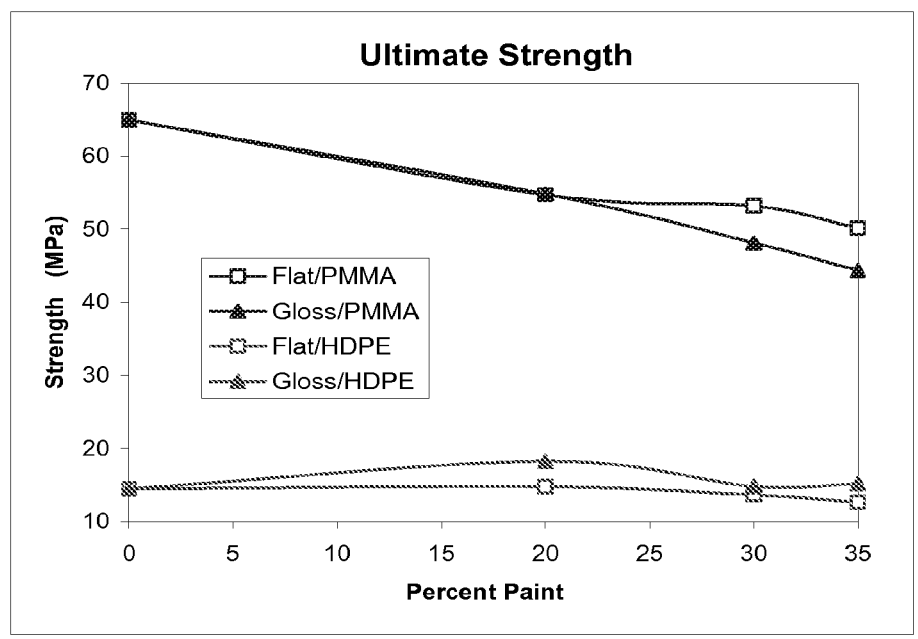
FIG. 4 depicts tensile ultimate strength as a function of weight percent paint in paint/PMMA and paint/HDPE blends.

FIG. 4 graphically depicts a comparison of the tensile ultimate strength as a function of paint content between Gloss/HDPE and Flat/HDPE blends and Gloss/PMMA and Flat/PMMA blends. The ultimate strength increases from 14.5 MPa for neat HDPE with gloss paint content but is fairly constant with the addition of flat paint. The ultimate strength of PMMA decreases linearly from 65.0 MPa with the addition of gloss paint and approximately linearly with the addition of flat paint.

Figure 5:
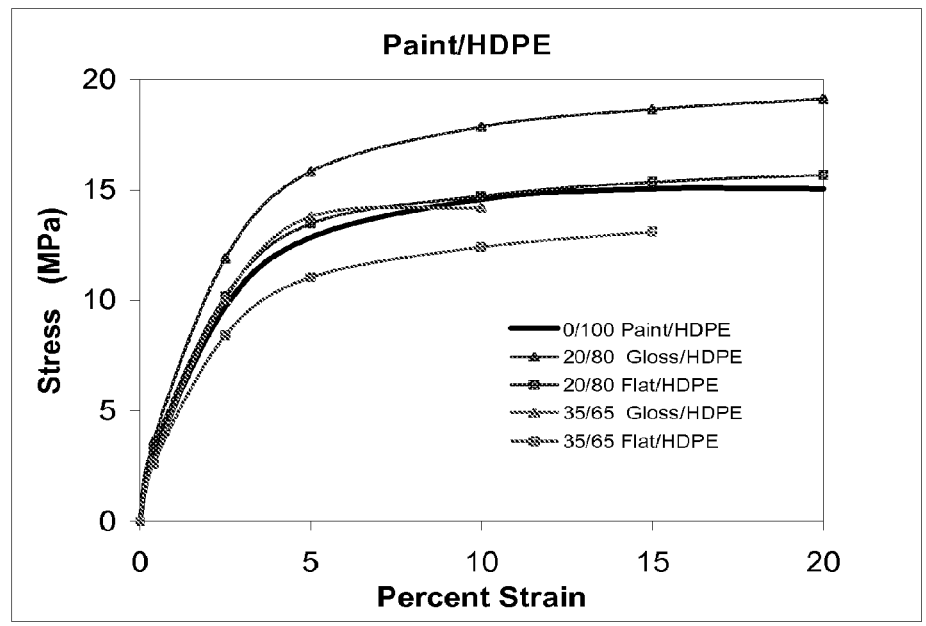
FIG. 5 represents stress-strain curves for gloss and flat paint/HDPE blends.
Figure 6:
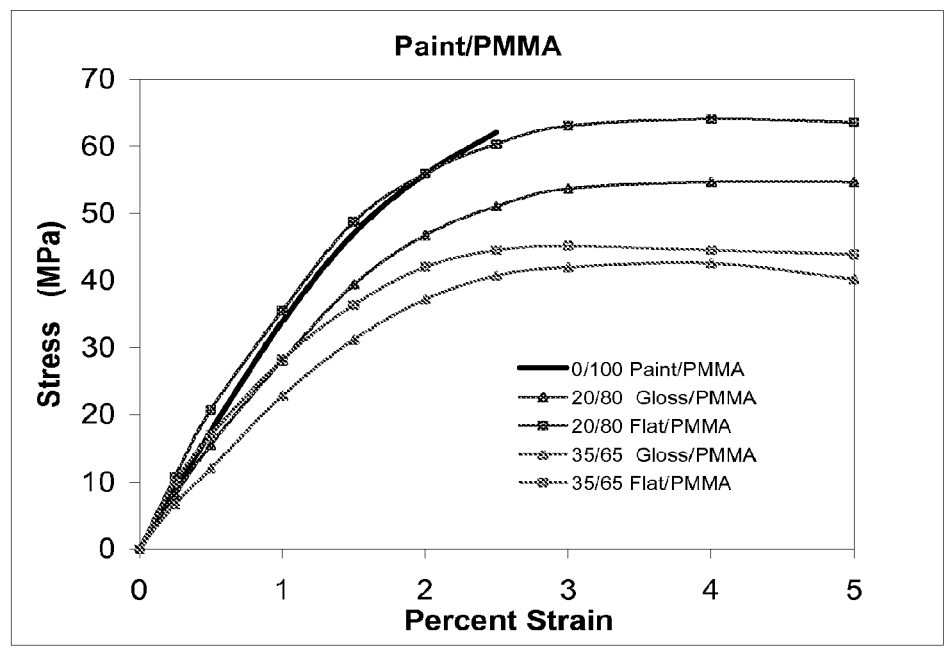
FIG. 6 represents stress-strain curves for gloss and flat paint/PMMA blends.

FIGS. 5 and 6 present the stress-strain curves for the gloss and flat Paint/HDPE and Paint/PMMA blends, respectively. Gloss and flat Paint/HDPE blends behave in a similar manner as neat HDPE. This result suggests that Paint/HDPE blends can replace HDPE in some applications. However, gloss and flat Paint/PMMA blends have a greatly increased toughness value, as is evident by the area under the stress-strain curves limited by the strain of failure. The enhanced toughness of Paint/PMMA blends is an astonishing result that provides an enhanced alternative to neat PMMA.

Figure 7:
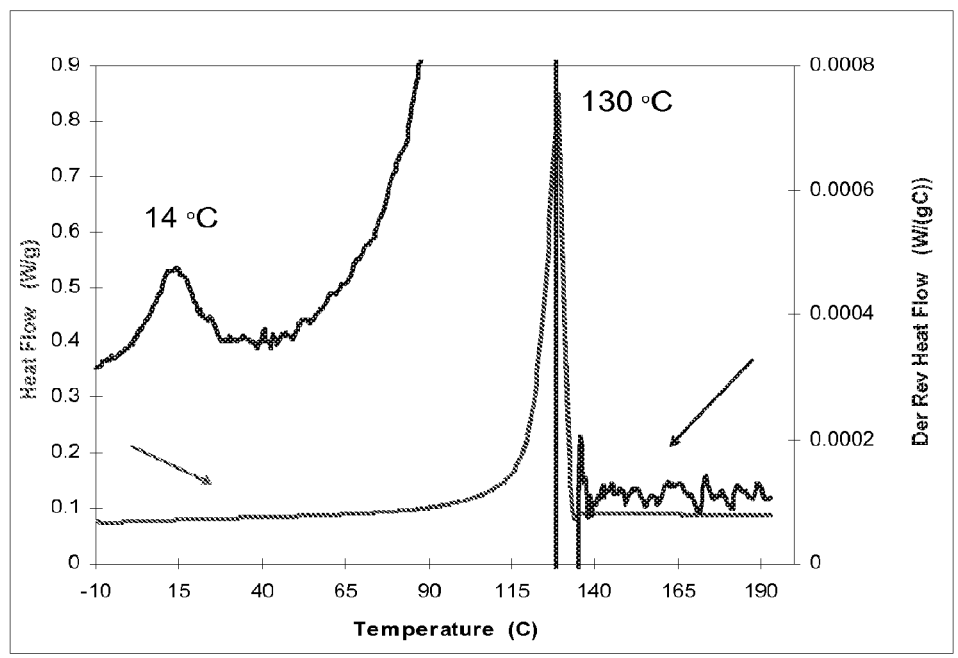
FIG. 7 shows differential scanning calorimetry (DSC) scans of a 35/65% by weight Gloss/HDPE blend.
Figure 8:
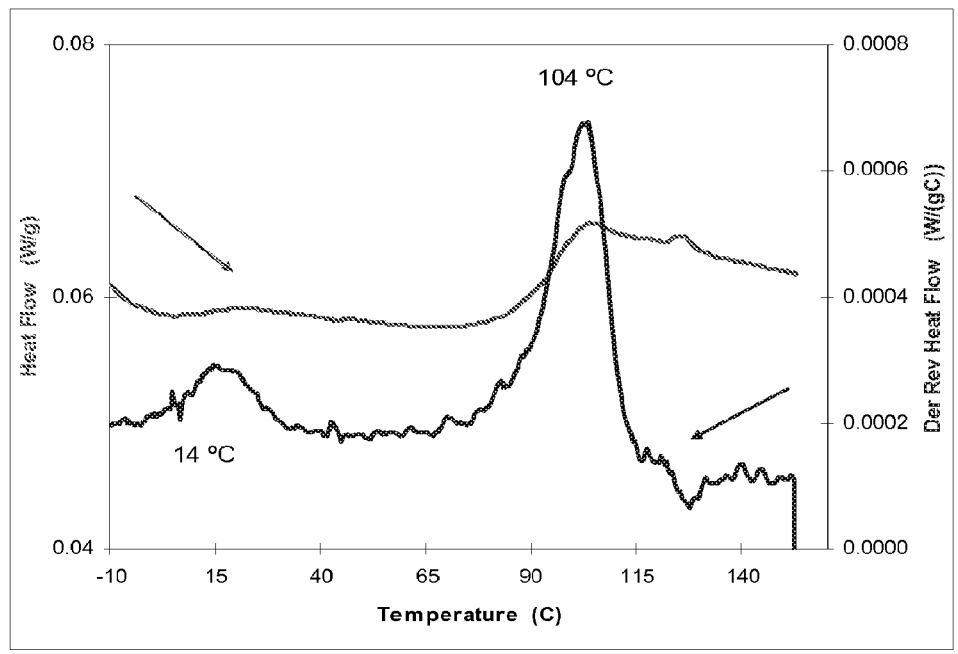
FIG. 8 shows differential scanning calorimetry (DSC) scans of a 35/65% by weight Gloss/PMMA blend.

FIGS. 7 and 8 present differential scanning calorimetry (DSC) scans of 35/65% by weight Gloss/HDPE and Gloss/PMMA, respectively. The total heat flow and the derivative of the reversing heat flow are plotted against temperature for both samples. In FIG. 6, the Gloss/HDPE sample, a glass transition of the paint component occurs at 14° C., and a melting transition of the HDPE component occurs around 129° C. In FIG. 7, the Gloss/PMMA sample, a glass transition of the paint component occurs at 14° C., and a glass transition of the PMMA component occurs at approximately 104° C.

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and script of the invention, and all such variations are intended to be included within the scope of the following claims.

What is claimed is:

1. A solid blend of polymers, characterized in that said solid polymer blend comprises a melt-blended extrudate of (a) unapplied liquid latex paint, which comprises a first polymer component and (b) a second polymer component in a solid or a liquid form immiscible in the melt phase with the first polymer component and selected from the group consisting of polyolefins and polymethylmethacrylate (PMMA), wherein the latex paint component comprises between about 20% and about 35% by weight of said blend and the second polymer component comprises between about 65% and about 80% by weight of said blend.

2. The blend of claim 1, wherein said latex paint is selected from the group consisting of flat paint and gloss paint.

3. The blend of claim 1, wherein said polyolefin is high-density polyethylene (HDPE).

4. The blend of claim 1, wherein said latex paint is gloss paint and said second polymer component is PMMA.

5. The blend of claim 3, wherein said second polymer component comprises between about 65 and about 80% PMMA by weight.

6. The blend of claim 5, wherein said second polymer component comprises about 65% PMMA by weight.

7. The blend of claim 1, wherein said paint polymer phase comprises one or more polymers selected from the group consisting of acrylate polymers, vinyl acrylate polymers, vinyl acetate polymers, polyurethanes, epoxies, neoprenes, and alkyd polyesters.

8. A method of preparing a solid blend of polymers, said method comprising:
(a) collecting unapplied liquid latex paint;
(b) melt-blending (i) said unapplied liquid latex paint, wherein said paint comprises a first polymer component with (b) (ii) a second polymer component in a solid or a liquid form immiscible in the melt phase with the first polymer component and selected from the group consisting of polyolefins and polymethylmethacrylate (PMMA), wherein the latex paint component comprises between about 20% and about 35% by weight of said blend and the second polymer component comprises between about 65% and about 80% by weight of said blend; and
(c) extruding the blend prepared in step (b).

9. The method of claim 8, wherein said first polymer component and said second polymer component are both in a liquid form prior to blending.

10. The method of claim 8, wherein said polyolefin is high-density polyethylene (HDPE).

11. The method of claim 8, wherein said latex paint is selected from the group consisting of flat paint, semi-gloss paint, and gloss paint.

12. The method of claim 8, further comprising forming an article with the polymer blend.

13. The method of claim 12, wherein said forming step comprises injection molding, blow molding, thermoforming, rotational molding, or extrusion molding.

14. An article comprising the polymer blend of claim 1.

15. The article of claim 14, wherein said article is selected from the group consisting of impact resistant substitutes for glass and packaging articles.

16. The article of claim 15, wherein said packaging articles are selected from the group consisting of containers, merchandise bags, shrink films, grocery sacks, and industrial liners.

17. An article formed by the method of claim 8.

18. The article of claim 17, wherein said article is selected from the group consisting of impact resistant substitutes for glass and packaging articles.

19. The article of claim 18, wherein said packaging articles are selected from the group consisting of containers, merchandise bags, shrink films, grocery sacks, and industrial liners.

* * * * *